Nov. 23, 1971          U. VULCAN ET AL          3,621,649
WATERTIGHT CONTROL MEMBER FOR WATCHES
Filed Dec. 1, 1969                    3 Sheets-Sheet 1

INVENTORS
UDREA  VULCAN
ETIENNE  CART
BY Imirie, Smiley, Snyder & Butrum
ATTYS.

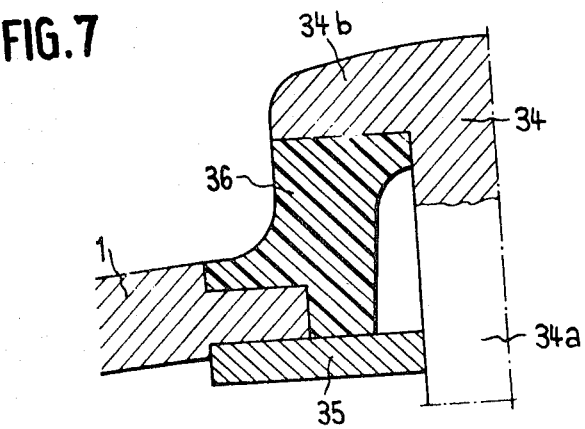
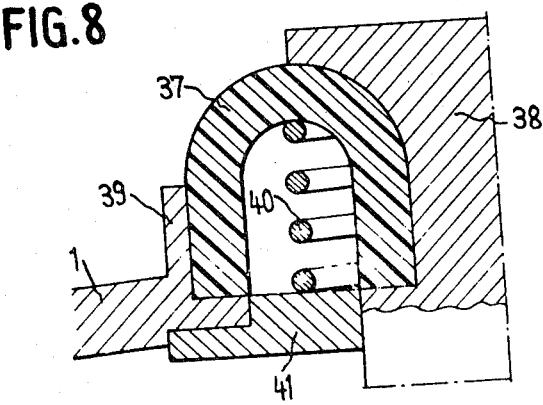
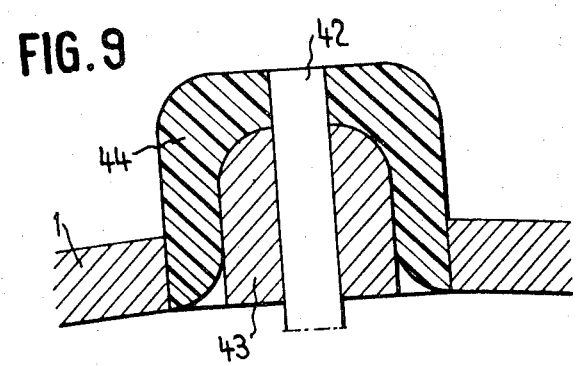

United States Patent Office 3,621,649
Patented Nov. 23, 1971

3,621,649
WATERTIGHT CONTROL MEMBER FOR WATCHES
Udrea Vulcan, Le Locle, and Etienne Cart, Bienne, Switzerland, assignors to Omega Louis Brandt & Frere S.A., Bienne, Bern, Switzerland
Filed Dec. 1, 1969, Ser. No. 881,228
Claims priority, application Switzerland, Dec. 18, 1968, 18,852/68
Int. Cl. G04b 37/08
U.S. Cl. 58—90 B                                8 Claims

ABSTRACT OF THE DISCLOSURE

A watertight control member for watches, comprising a gasket which adheres on the one hand to the watchcase or to a part rigidly fixed to the watchcase and, on the other hand, to the movable portion of the control member, the middle portion of said gasket being susceptible of deformation for permitting the actuation of the control member while continuing the ensure the watertightness.

---

The present invention relates to a watertight control member for watches, which is broadly characterized in that it comprises a gasket adhering, on the one hand, to the watchcase or to a part rigidly fixed to the watchcase and, on the other hand, to the movable portion of the control member, the middle portion of said gasket being susceptible of deformation for permitting the actuation of the control member while continuing the ensure the watertightness.

The accompanying drawings illustrate, by way of example, some embodiments of the invention.

FIGS. 3 to 9 are longitudinal sectional views of the other embodiments.

Figure 1:
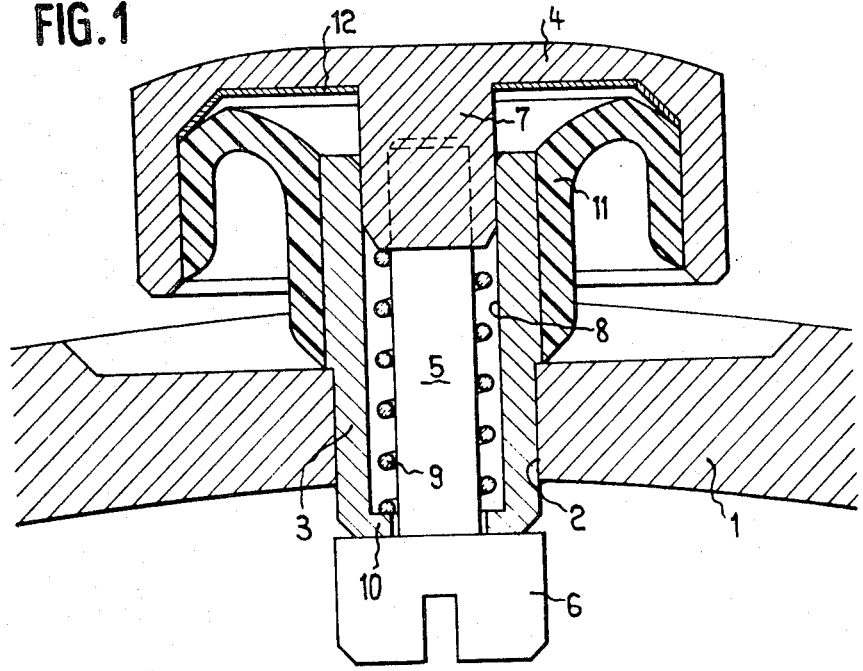
FIG. 1 is a longitudinal sectional view of the first embodiment, the control member consisting of a push-piece being in its rest position.

The case of the watch (FIG. 1), comprising a caseband 1, is provided with a cylindrical opening 2 in which is secured a guiding tube 3 of a general cylindrical shape. The tube 3 may be driven, welded or screwed into the opening 2.

A cup-shaped push-piece body 4 is fixed to the outer end of a push-piece stem 5, the inner end of which presents a head 6 adapted to act upon a member of the mechanism to be controlled (not shown) and to limit the return stroke of the push-piece body 4. The latter has a central projection 7 susceptible of sliding in a corresponding bore 8 of the guiding tube 3. A coil spring 9 surrounds the push-piece stem 5 and bears, on the one hand, against the end face of the projection 7 and, on the other hand, against an inner shoulder 10 of the guiding tube 3, said spring 9 serving to push back the body 4 towards the outside when it is no longer actuated.

The push-piece has a gasket 11, having the shape of a turned up sleeve, said gasket being made for instance from a elastomer of the class of the polyurethanes, such as the product bearing the trademark "Isofrane." The gasket 11 adheres, on the one hand, to the guiding tube 3 and, on the other hand, to the inner wall of the cup or calotte of the push-piece body 4, the middle portion of the gasket 11 being free so as to permit the axial displacement of the push-piece. Preferably, the gasket 11 is molded directly on the tube 3 and on the wall of the calotte 4, but it might also be fixed by sticking or by a physico-chemical bond called "adherization" and which is realized during the vulcanization phase of the elastomer, or by the combined use of both processes.

A very thin washer 12 of plastics material, for instance of Teflon, is applied against the bottom of the calotte 4. The purpose of this washer is to prevent the gasket 11 from adhering to this bottom when the gasket 11 is fixed to the tube 3 and to the inner wall of the calotte 4. Said washer might also be made of metal.

Figure 2:
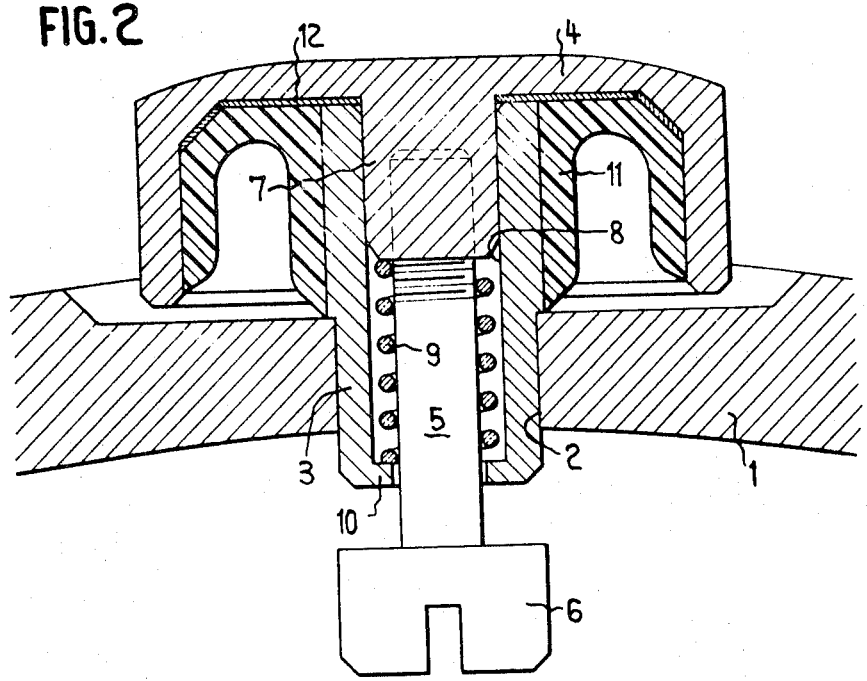
FIG. 2 is a similar sectional view, the push-piece being in its depressed position.

When the push-piece is in its rest position, it has the position illustrated in FIG. 1, the spring 9 keeping the body 4 away from the caseband 1. When the push-piece is depressed, FIG. 2, the calotte 4 comes nearer to the caseband 1 and the gasket 11 is deformed without ceasing to ensure a perfect watertightness, preventing any penetration of moisture or dust within the watch.

The control member, instead of consisting of a push-piece, i.e. a member susceptible of effecting only an axial movement, might effect a rotation of a limited amplitude, in order to control a mechanism of the watch. The case might also be contemplated, in which the control member would effect both an axial movement and a rotation of a limited amplitude. The amplitude of said rotation might reach according to the constructions for instance 20 to 80°.

Figure 3:
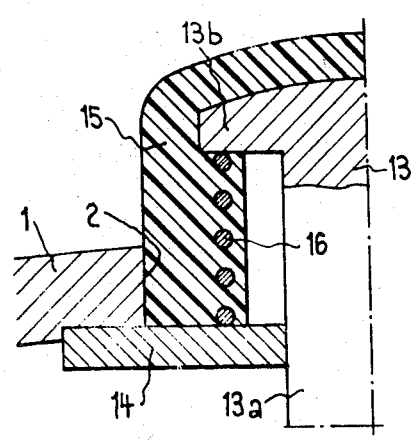
Figure 4:
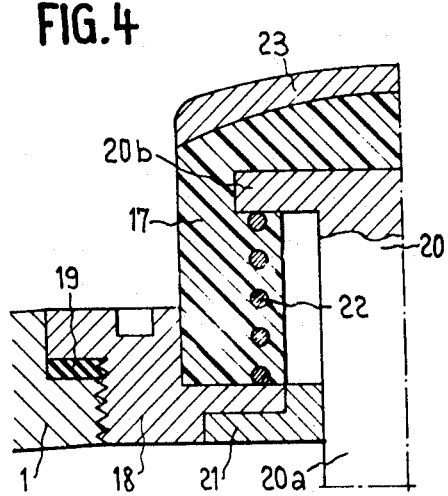

In the embodiment of FIG. 3, the guiding tube is omitted. The push-piece body 13 consists of a cylindrical stem 13a and a wider head 13b. The stem 13a is guided by a bore of a ring 14 rigidly fixed to the caseband 1. A cup-shaped gasket 15 adheres, on the one hand, to the caseband 1 and, on the other hand, to the head 13b of the push-piece body 13. A coil spring 16 is embedded and "adherized" in the gasket 15 and bears, on the one hand, against the ring 14 and, on the other hand, against the head 13b. This spring serves here, as in the other embodiments illustrated and described, to bring back the control member after it has been depressed; in addition, it tends to oppose the deformation of the elastomer produced by the outer pressure. The shape of the coil spring need not be cylindrical, but might also be e.g. conical. A certain clearance is left between the gasket 15 and the stem 13a of the push-piece body 13, for permitting the middle portion of the gasket 15 to be deformed when the push-piece is depressed. Here too, and as in all of the embodiments illustrated, the control member might be a member effecting a rotation of a limited amplitude or a combined axial and rotative movement. A protecting metal calotte might cover the upper portion of the gasket 15.

Figure 5:
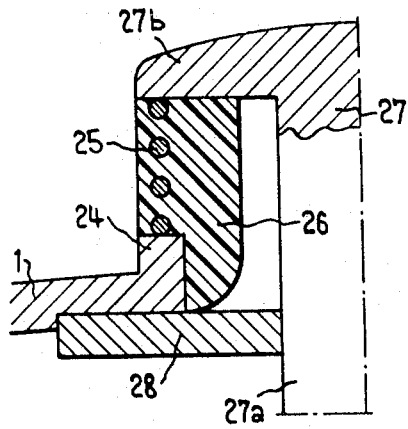

FIG. 5 shows a slightly modified embodiment, in which the gasket 17, having the shape of a cup or calotte, does not adhere to the caseband 1, but to a piece 18 screwed on the caseband 1 with interposition of a packing ring 19. The push-piece body 20 has again a cylindrical stem 20a and a head 20b; here, the stem 20a is guided by a ring 21 rigidly fixed to the piece 18. A coil spring 22, embedded in the gasket 17, bears on the one hand against the head 20b of the push-piece body 20 and on the other hand against a shoulder of the piece 18. A protecting metal calotte 23 covers the upper portion of the gasket 17. In a modified embodiment, not shown, the spring 22 might be independent of the gasket 17 and would be arranged, in this case, in the free space left between the gasket 17 and the stem 20a of the push-piece body 20.

FIG. 5 represents an embodiment in which the caseband 1 has a collar or flange 24 on which bears the coil spring 25. The gasket 26 has the shape of a sleeve and adheres on the one hand to the flange 24 and on the other hand to the head 27b of the push-piece body 27. A piece 28, rigidly fixed to the caseband 1, guides the stem 27a of the body 27. The coil spring 25 is embedded in the gasket 26.

Figure 6:
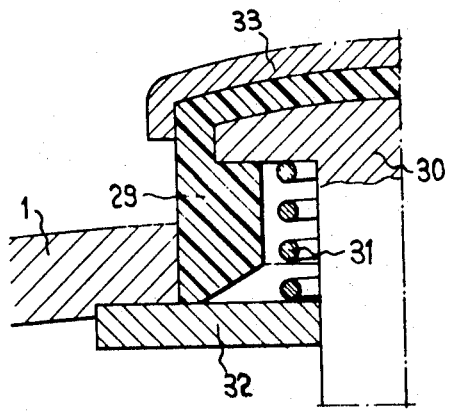

In FIG. 6 there is found again a gasket 29 having the shape of a cup or calotte, adhering to the caseband 1 and to the head of the push-piece body 30. The return spring 31 bears against a piece 32 rigidly fixed to the caseband 1 and against the head of the body 30. A protecting metal calotte 33 covers the top portion of the gasket 29.

The embodiment of FIG. 7 differs from the preceding ones in that it does not include any return spring. The push-piece body 34 has a cylindrical stem 34a and a head 34b, the stem 34a being guided by a piece 35 rigidly fixed to the caseband 1. The gasket 36 adheres, on the one hand, to the caseband 1 and, on the other hand, to the lower face of the head 34b of the push-piece body 34. For increasing the surface of adherence, the caseband 1 is provided with a stepped opening. When the push-piece is actuated, the gasket 36 itself ensures the return movement.

FIG. 8 illustrates another embodiment wherein the gasket 37 has a cross-section having the shape of an inverted U. One of the legs of this U adheres to the push-piece body 38, whereas the lower portion of the other leg adheres to a collar or flange 39 of the caseband 1. The coil spring 40 bears against the bent portion of the U and against a piece 41 rigidly fixed to the caseband 1. The piece 41 also serves to guide the body 38. The spring might be omitted.

Finally, FIG. 9 represents a further embodiment including a push-piece body 42 consisting of a cylindrical stem. The stem 42 passes freely through a piece 43 on which is arranged the gasket 44, or else the stem 42 is rigidly fixed to said piece 43. The gasket 44 adheres on the one hand to the upper portion of the stem 42 and on the other hand to the caseband 1. When the push-piece is depressed, the middle portion of the gasket 44 is deformed towards the outside, going away from the piece 43. In this embodiment, as in that of FIG. 7, the gasket ensures itself the return of the push-piece, no coil spring being provided.

We claim:
1. A watertight watch construction comprising:
   a watch case having an opening for access to the interior thereof,
   a control member moveably mounted in said opening for operating works within said case, said member including a portion exterior of said case for effecting movement of said member, and
   an annular flexible gasket having portions permanently adhesively bonded respectively to said case and the exterior portion of said member, said gasket having a deformable unattached portion intermediate of said bonded portions and enabling movement of said member relative to said case.

2. A construction according to claim 1, wherein said gasket is of inverted cup shape overlying the outer end of said member with the central portion of said gasket bonded to said member and the peripheral portion of said gasket bonded to said case.

3. A construction according to claim 1, wherein the bonded portions of said gasket are vulcanized to said case and member respectively.

4. A construction according to claim 1, wherein,
   said member includes a stem moveable in said case opening and a head on the outer end of said stem,
   said gasket having one end portion bonded to said watch case and the other end portion bonded to said head.

5. A construction according to claim 4, wherein said gasket is resilient and constantly urges said member outwardly of said case.

6. A construction according to claim 4, wherein said case comprises a tube surrounding said opening,
   said head having a peripheral flange extending toward said case, and
   said gasket being of U-shaped section with one branch thereof bonded to the outer surface of said tube and the other branch thereof bonded to the inner surface of said peripheral flange.

7. A construction according to claim 4, comprising a coiled spring interposed between said case and said head.

8. A construction according to claim 7, wherein said spring is embedded in said gasket.

References Cited

UNITED STATES PATENTS

| | | | |
|---|---|---|---|
| 2,237,860 | 4/1941 | Bolle | 58—90 B |
| 2,771,734 | 11/1956 | Morf | 58—90 B |
| 3,188,793 | 6/1965 | Morf | 58—90 B |
| 3,453,819 | 7/1969 | Simon | 58—90 B |
| 3,475,901 | 11/1969 | Soguel | 58—90 B |

FOREIGN PATENTS

| | | | |
|---|---|---|---|
| 671,819 | 5/1952 | Great Britain | 58—90 B |
| 160,802 | 3/1933 | Switzerland | 58—90 B |
| 201,681 | 12/1938 | Switzerland | 58—90 B |

RICHARD B. WILKINSON, Primary Examiner

G. H. MILLER, Jr., Assistant Examiner